Feb. 15, 1949. F. W. AVILA 2,461,867
VEHICLE AXLE SUSPENSION
Filed Aug. 30, 1947
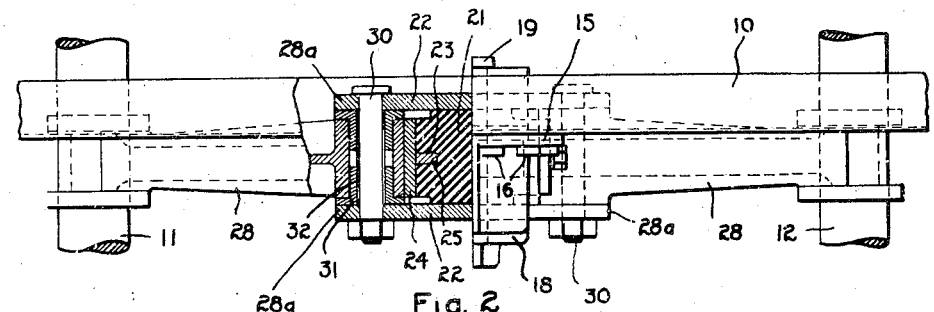
INVENTOR.
Frank W. Avila
BY Paul O. Pippel
Atty.

Patented Feb. 15, 1949

2,461,867

UNITED STATES PATENT OFFICE 2,461,867

VEHICLE AXLE SUSPENSION

Frank W. Avila, Columbia City, Ind., assignor to International Harvester Company, a corporation of New Jersey Application August 30, 1947, Serial No. 771,436

4 Claims. (Cl. 280—104.5)

This invention relates to a suspension system for vehicle axles and more particularly to an axle structure of the bogie type.

The invention relates broadly to the provision of means in suspension systems of the type characterized by levers and the use of resilient material such as rubber in lieu of the conventional coil or leaf springs and it is primarily proposed to provide a simple and inexpensive suspension system that may be conveniently and efficiently employed in motor vehicles, particularly motor trucks.

The foregoing and other important objects and desirable features inherent in and encompassed by the invention, together with many of the purposes and uses thereof, will become readily apparent from a reading of the ensuing description in conjunction with the annexed drawings.

In the drawings:

Figure 1 is a side elevation of the rear portion of a motor vehicle equipped with a suspension system constructed according to the invention;

Figure 2 is a plan view, partly in section, of the structure shown in Figure 1, the view being taken substantially along the line 2—2 of Figure 1; and Figure 3 is a transverse sectional view taken substantially along the line 3—3 of Figure 1.

The suspension system may be employed in connection with any type of motor vehicle or even in connection with a trailing vehicle. Such vehicle may have a main frame or chassis including a longitudinal main frame member as indicated by the numeral 10 in the drawings. In addition to being supported on other wheels than those shown, the vehicle may include a pair of longitudinally spaced transverse axles 11 and 12 which carry wheels 13 and 14 respectively.

Although the drawings show only one side of a preferred construction embodying the invention, it will be understood that both sides of the suspension system are alike. The main frame includes, at each side thereof between the axles 11 and 12, a support or bracket 15 rigidly secured to the frame as by a plurality of capscrews or bolts 16. The bracket has an inner portion depending below the frame as at 17 and an outer depending portion 18 extending only part way down and parallel to the inner portion 17. The portions 17 and 18 are transversely spaced apart and carried therebetween is a supporting pin 19 headed at one end and provided with a nut at its other end. The pin 19 carries a hollow bushing or sleeve 20 which passes through an opening in a large substantially cubical block 21 of resilient material such as rubber. The sleeve 20 also passes through a pair of apertured plates 22, one of which is disposed at each side of the block 21. The plates 22 thus confine the block 21 therebetween insofar as concerns the transverse dimension of the block.

Each of the opposite longitudinal faces of the block is provided with a vertical slot 23 which provides part of means for securing to the block a pair of end plate members 24. Each of these members is constructed of metal and is preferably T-shaped in transverse cross-section, the leg of the T as at 25 fitting a proximate slot 23 in the block 21. The portion 25 is rigidly connected to the block preferably by being bonded thereto. The two parts of each plate member are here shown as being secured together by welding; although, the part may be of unitary construction.

Each plate member 24 is provided with a pair of vertically spaced threaded bores 26, each of which receives a capscrew 27 for the purpose of securing to the member 24 a flanged longitudinally extending suspension arm 28. The flange of the arm is indicated by the numeral 29.

Each of the plates 22 is provided with a pair of longitudinally spaced apart apertured ears 28a. Bolts 30 are passed respectively through the apertured ears 28a and through bushings 31 received in bores 32 respectively in the arms 28. The arms 28 are thus pivotally connected by means of the pins 30 and bushings 32 to the supporting bracket 15 by means of the plates 22 and headed pin 19. In addition, the arms 28 are secured by means of the capscrews 27 and plate members 24 to the rubber block 21.

One of the arms 28 extends longitudinally forwardly and is pivoted at 33 to the upper portion of a bracket 34 carried on the axle 11. The other arm extends longitudinally rearwardly or in the other direction and is pivotally connected at 35 to a bracket 36 carried by the other axle 12. The bracket 34 depends below the axle and is provided with an apertured ear 37 to which is pivotally connected one end of a radius rod 38. The bracket 36 on the axle 12 is provided with a depending apertured ear 39 which is pivotally connected to one end of a radius rod 40. The radius rods extend longitudinally toward each other and toward the depending inner portion 17 of the bracket 15 and are connected to the portion 17 by means of a pair of pivot pins 41. The arms 28 and radius rods 38 and 40 thus connect the axles 11 and 12 for vertical movement toward and away from the vehicle frame depending upon loading of the vehicle or in response to varying ground contour encountered by wheels 13 and 14.

In the use of a vehicle equipped with the suspension system illustrated and described, loading and riding of the vehicle are accomplished by means of the suspension arms 28 and rubber block 21. As one arm pivots upwardly about its pivot pin 30, the flange portion 29 thereof operates through its associated T-shaped member 24 to compress the block 21. The block tends to resist compression and in turn exerts pressure against the T-shaped member 24 and flange 29 of the other arm 28, thus equalizing the load distribution between the axles 11 and 12. Of primary importance is the simplicity inherent in the construction set forth. The entire suspension system may be disconnected from the bracket 15 by removal of the headed pin 19. The pins or bolts 30, in addition to connecting the arms 28 to the plates 22, serve also to tie the plates 22 together.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore that the particular structural and functional aspects emphasized here are not intended to exclude, but rather to suggest, such other adaptations and modification of the invention as fall within the spirit and scope of the invention as defined in the appended claims.

What is claimed is:

1. For a vehicle including a longitudinal frame member and a pair of longitudinally spaced transverse axles: a suspension system for connecting the frame member and axles, comprising bracket means carried by the frame member between the axles; means connected to the bracket means including a pair of transversely spaced longitudinally extending plates having a block of rubber or the like therebetween; a first arm pivoted at one end on a transverse axis to the plates and extending toward and connected at its other end to one axle; a second arm pivoted at one end on a transverse axis spaced longitudinally from the pivot of the first arm; said pivoted connections of the arms to the plates to include means for holding the plates together with the block therebetween; and means respectively on the arms and engaging the block of rubber or the like for compressing said block upon pivoting of the arms upwardly by the axles.

2. For a vehicle including a longitudinal frame member and a pair of longitudinally spaced transverse axles; a suspension system for connecting the frame member and axles, comprising bracket means carried by the frame member between the axles; means connected to the bracket means including a pair of transversely spaced longitudinally extending plates having a block of rubber or the like therebetween and having the opposite longitudinally spaced faces of the block respectively provided with metal plates; a first arm pivoted at one end on a transverse axis to the plates and extending toward and connected at its other end to one axle; a second arm pivoted at one end on a transverse axis spaced longitudinally from the pivot of the first arm; and means respectively on the arms and engaging the block of rubber or the like for compressing said block upon pivoting of the arms upwardly by the axles; said means including flanges secured respectively to the arms and to the metal plates.

3. The invention set forth in claim 2, in which: each metal plate includes an interior web embedded in and bonded to the block.

4. The invention set forth in claim 2, in which: each metal plate is T-shaped in transverse section and has the leg of the T embedded in and bonded to the block and the bar of the T secured to the flange of the associated arm.

FRANK W. AVILA.

REFERENCES CITED

The following references are of record in the file of this patent:

UNITED STATES PATENTS

| Number | Name | Date |
|---|---|---|
| 2,265,518 | Coote et al. | Dec. 9, 1941 |